(12) United States Patent
Fish, Jr. et al.

(10) Patent No.: US 9,838,653 B2
(45) Date of Patent: Dec. 5, 2017

(54) ROOF MOUNTED IMAGER MODULE

(75) Inventors: Richard T. Fish, Jr., Jenison, MI (US);
Peter N. Rizk, Holland, MI (US);
Danny L. Minikey, Jr., Fenwick, MI (US); Mark R. Roth, Coloma, MI (US); Frederick T. Bauer, Holland, MI (US); Christian M. Kemperman, Grand Haven, MI (US); Danny L. Suman, Holland, MI (US); Andrew J. LeVesque, Holland, MI (US); David J. Cammenga, Zeeland, MI (US); Michael F. Lisowski, Holland, MI (US); Sandra Lynn Suman, legal representative, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 1362 days.

(21) Appl. No.: 13/527,375

(22) Filed: Jun. 19, 2012

(65) Prior Publication Data

US 2012/0327234 A1 Dec. 27, 2012

(51) Int. Cl.
*H04N 7/18* (2006.01)
*B60R 11/04* (2006.01)

(52) U.S. Cl.
CPC ............. *H04N 7/185* (2013.01); *B60R 11/04* (2013.01)

(58) Field of Classification Search
CPC ................................ H04N 7/185; B60R 11/04
USPC ........................................................ 348/148
See application file for complete search history.

(56) References Cited

U.S. PATENT DOCUMENTS

| | | |
|---|---|---|
| 4,063,258 A | 12/1977 | Allen |
| 4,621,785 A | 11/1986 | Embra |
| 5,619,036 A | 4/1997 | Salvio et al. |
| 5,760,828 A | 6/1998 | Cortes |
| 5,833,101 A | 11/1998 | Watkins |
| 6,333,759 B1 | 12/2001 | Mazzilli |
| 6,536,961 B1 * | 3/2003 | Gillies .......................... 396/427 |
| 6,580,373 B1 | 6/2003 | Ohashi |
| 7,111,996 B2 | 9/2006 | Seger et al. |
| 7,265,656 B2 | 9/2007 | McMahon et al. |
| 7,448,812 B2 | 11/2008 | Heibel |
| 7,499,100 B2 | 3/2009 | Miyazaki et al. |
| 7,609,961 B2 * | 10/2009 | Park .............................. 396/429 |
| 7,881,496 B2 * | 2/2011 | Camilleri et al. ............ 382/104 |
| 7,883,064 B2 | 2/2011 | Luft et al. |
| 2006/0238318 A1 * | 10/2006 | Brouwer et al. .............. 340/435 |
| 2007/0182817 A1 * | 8/2007 | Briggance ..................... 348/118 |
| 2007/0236569 A1 | 10/2007 | Lin |
| 2009/0122141 A1 | 5/2009 | Nakamura et al. |

(Continued)

FOREIGN PATENT DOCUMENTS

| | | |
|---|---|---|
| EP | 1006486 A2 | 6/2000 |
| EP | 1227683 A1 | 7/2002 |

*Primary Examiner* — Nguyen Truong
(74) *Attorney, Agent, or Firm* — Price Heneveld LLP; Bradley D. Johnson

(57) ABSTRACT

An imager module for a vehicle includes a support having a first side and a second side. A shroud is operably coupled with the first side. The support and the shroud define a cavity. A viewing aperture is disposed in one of the support and the shroud. An imager system is disposed in the cavity. An electrical connector is configured to provide communication with the imager system. The electrical connector is disposed outside the cavity in abutting contact with the second side of the support.

17 Claims, 17 Drawing Sheets

(56) References Cited

U.S. PATENT DOCUMENTS

| | | | | |
|---|---|---|---|---|
| 2009/0250533 A1* | 10/2009 | Akiyama | ............. | B60S 1/58 239/284.1 |
| 2010/0118145 A1* | 5/2010 | Betham et al. | ............. | 348/148 |
| 2011/0317298 A1* | 12/2011 | van Stiphout | ............. | 359/872 |

* cited by examiner

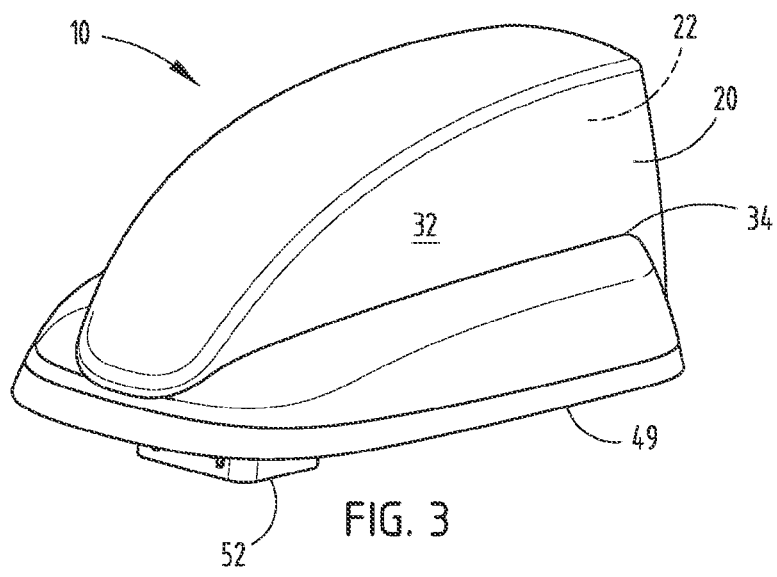
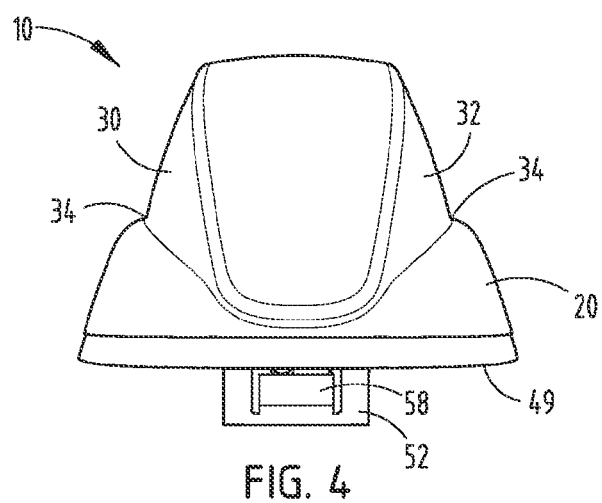
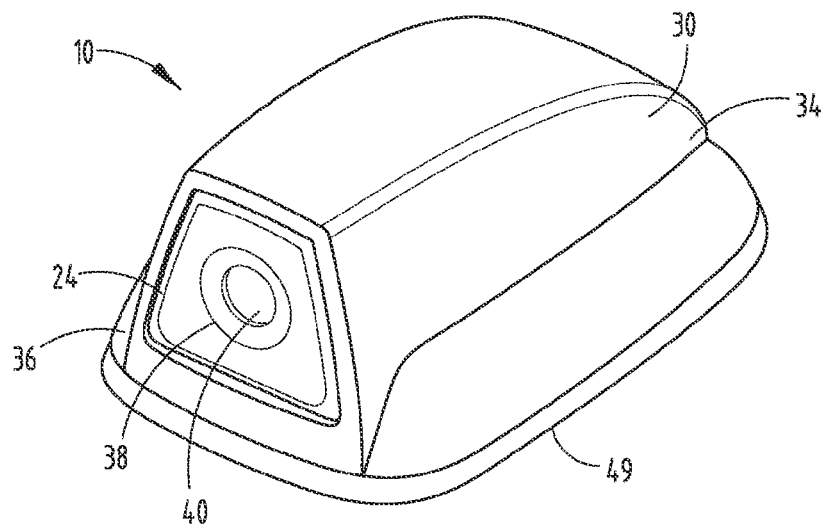

ROOF MOUNTED IMAGER MODULE

CROSS-REFERENCE TO RELATED APPLICATIONS

This application claims priority to and the benefit under 35 U.S.C. §119(e) of U.S. Provisional Patent Application Nos. 61/521,919, filed on Aug. 10, 2011, entitled "ROOF MOUNTED IMAGER MODULE"; and 61/501,016, filed on Jun. 24, 2011, entitled "ROOF MOUNTED IMAGER MODULE," the entire disclosures of which are hereby incorporated herein by reference.

BACKGROUND OF THE INVENTION

The present invention concerns an imager module, and more particularly relates to an imager module that is attachable to an exterior panel or window of a vehicle, such as a roof or a trunk, and that is adapted to convey data to an interior rearview display.

SUMMARY OF THE INVENTION

One aspect of the present invention includes an imager module for a vehicle having a support including a first side and a second side. A shroud is operably coupled with the first side. The support and the shroud define a cavity. A viewing aperture is disposed in one of the support and the shroud. An imager system is disposed in the cavity. An electrical connector is configured to provide communication with the imager system. The electrical connector extends outside the cavity through the support.

Another aspect of the present invention includes an imager system for a vehicle imager module having a support including a first side and a second side. A shroud is operably coupled with the first side. The support and the shroud define a cavity. A viewing aperture is disposed in one of the support and the shroud. A first circuit board is disposed in the cavity and is operably coupled with an imager device. A second circuit board is oriented substantially orthogonal to the first circuit board. An electrical connector is at least partially disposed outside the cavity and is in communication with at least one of the first and second circuit boards.

Yet another aspect of the present invention includes an imager system for a vehicle including an exterior imager module. A rearview assembly is disposed inside the vehicle and includes a receiver, a processor, and a display. A transmitter is operably coupled with the exterior imager module. Data is received by the exterior imager module and relayed wirelessly from the transmitter to the receiver. The data is processed by the processor and displayed on the display.

Yet another aspect of the present invention includes an imager module for a vehicle having a support including a first side and a second side. An imager system is disposed adjacent to the first side of the support. A shroud at least partially covers the imager system. The shroud includes at least one air channel disposed on an outer periphery thereof to direct air near a viewing aperture of the imager module.

These and other aspects, objects, and features of the present invention will be understood and appreciated by those skilled in the art upon studying the following specification, claims, and appended drawings.

BRIEF DESCRIPTION OF THE DRAWINGS

FIG. 3 is a top front perspective view of one embodiment of an imager module of the present invention;

FIG. 4 is a front elevational view of the imager module of FIG. 3;

FIG. 5 is a rear top perspective view of the imager module of FIG. 3;

DETAILED DESCRIPTION OF EMBODIMENTS

Figure 1:
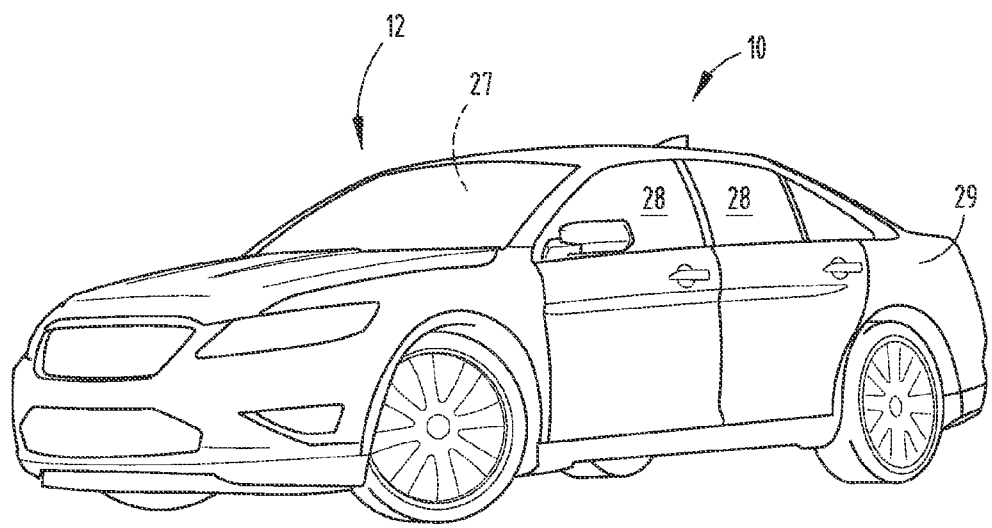
FIG. 1 is a front perspective view of a vehicle incorporating one embodiment of the present invention.

For purposes of description herein, the terms "upper," "lower," "right," "left," "rear," "front," "vertical," "horizontal," and derivatives thereof shall relate to the invention as orientated in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Imager Module

Figure 6:
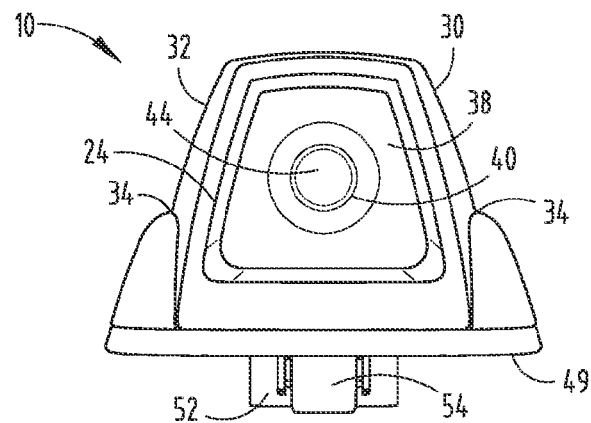
FIG. 6 is a rear elevational view of the imager module of FIG. 3.
Figure 7:
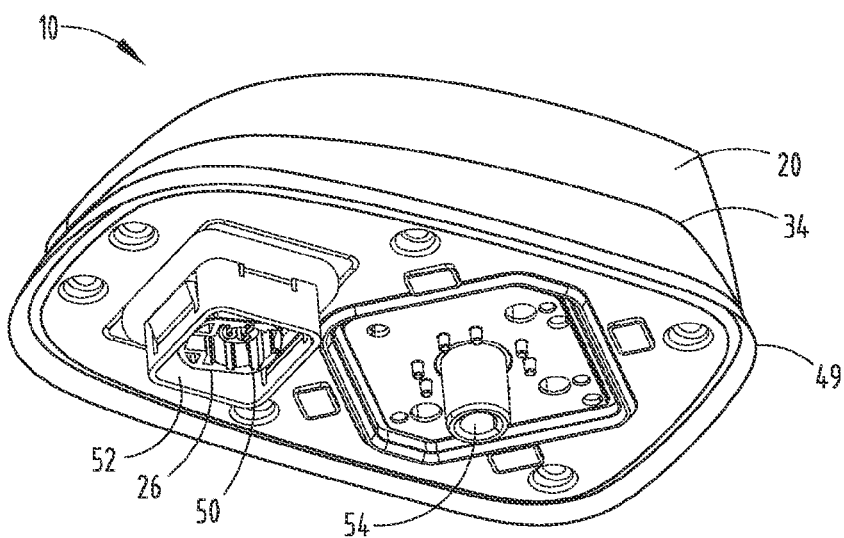
FIG. 7 is a bottom rear perspective view of the imager module of FIG. 3.
Figure 8:
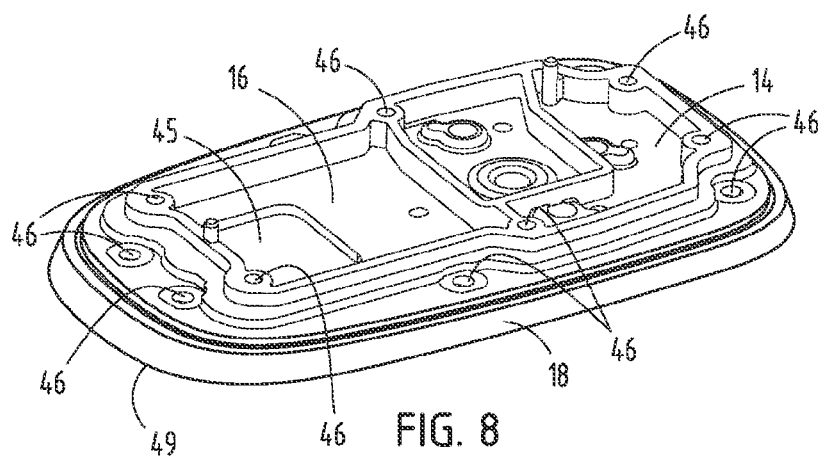
FIG. 8 is a top perspective view of one embodiment of a support for an imager module of the present invention.
Figure 9:
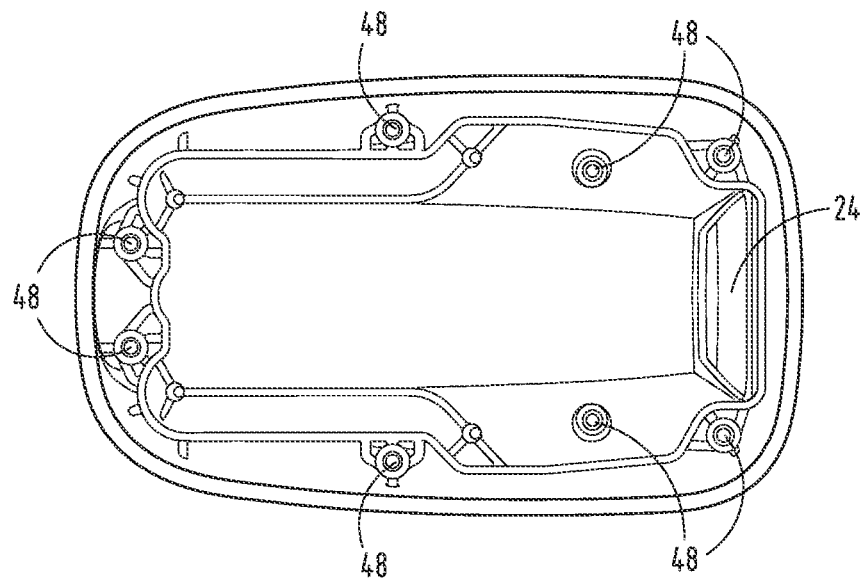
FIG. 9 is a bottom plan view of one embodiment of a shroud for an imager module of the present invention.
Figure 10:
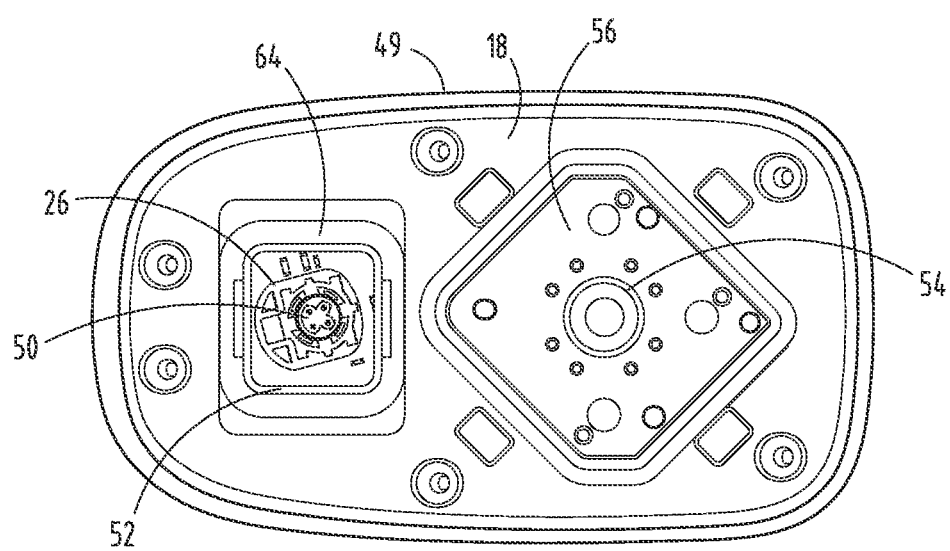
FIG. 10 is a bottom plan view of the imager module of FIG. 3.
Figure 13:
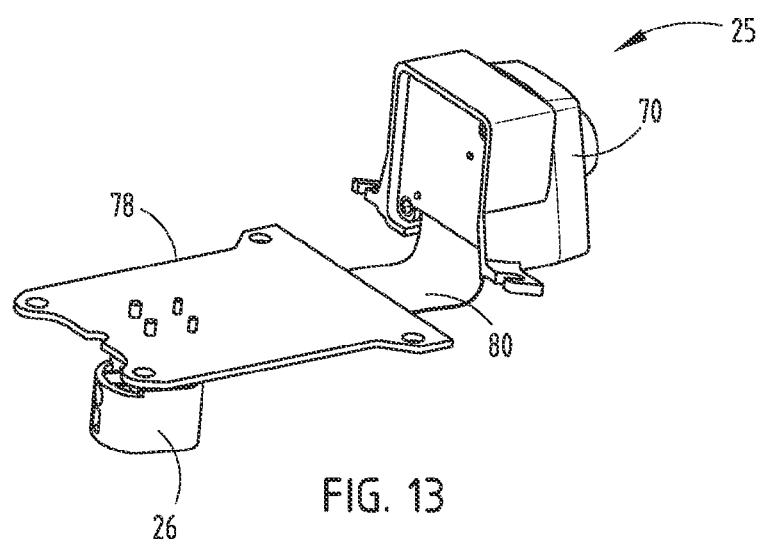
FIG. 13 is a top front perspective view of an imager system for an imager module of the present invention.
Figure 14:
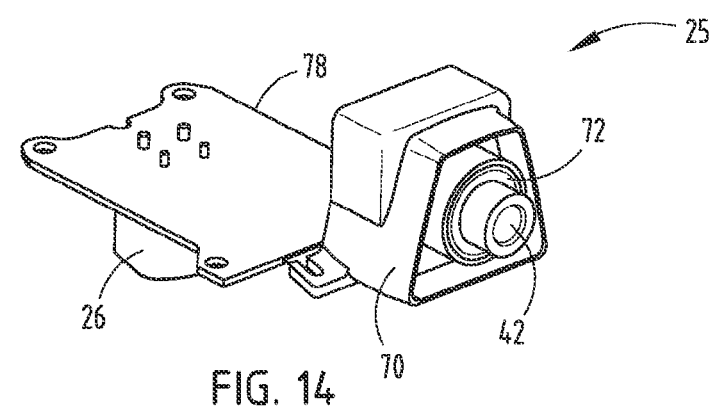
FIG. 14 is a top rear perspective view of an imager system for an imager module of the present invention.
Figure 15:
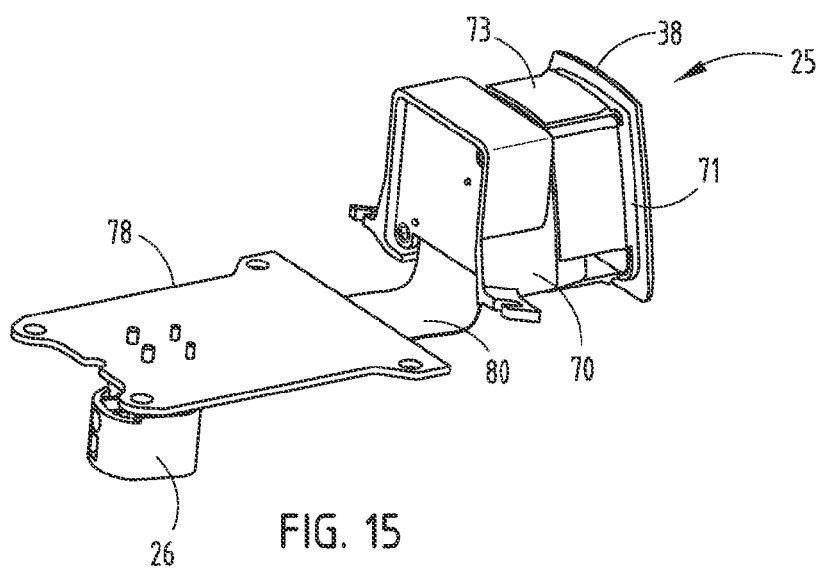
FIG. 15 is a top front perspective view of an imager system for an imager module of the present invention with a protective cover.
Figure 16:
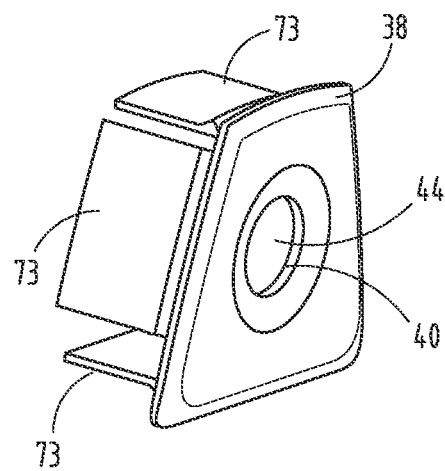
FIG. 16 is a top rear perspective view of one embodiment of a protective cover for an imager module of the present invention.
Figure 17:
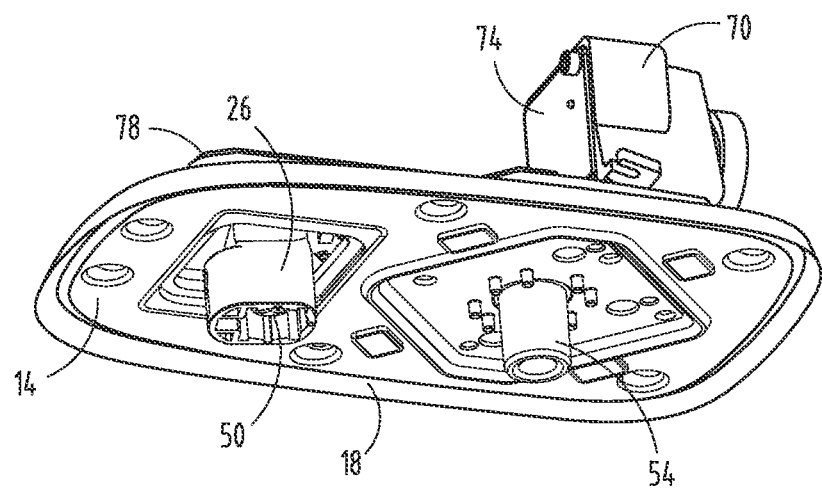
FIG. 17 is a bottom perspective view of a support and imager system for an imager module of the present invention.

As generally shown in FIGS. 1-19, reference number 10 generally designates an imager module for a vehicle 12 including a support 14 (FIGS. 8 and 17-19) having a first side 16 (FIGS. 8 and 18) and a second side 18 (FIGS. 8, 10, and 17). A shroud 20 (FIGS. 3, 4, 7, and 12) is operably coupled with the first side 16. The support 14 and the shroud 20 define a cavity 22 (FIG. 3). A viewing aperture 24 (FIGS. 5, 6, and 9) is disposed in one of the support 14 and the shroud 20. An imager system (FIGS. 13-15) is disposed in the cavity 22. An electrical connector 26 (FIGS. 7, 10, 14, 15, and 17) is configured to provide communication with the imager system 25. The electrical connector 26 is disposed outside the cavity 22 proximate the second side 18 of the support 14.

Figure 2:
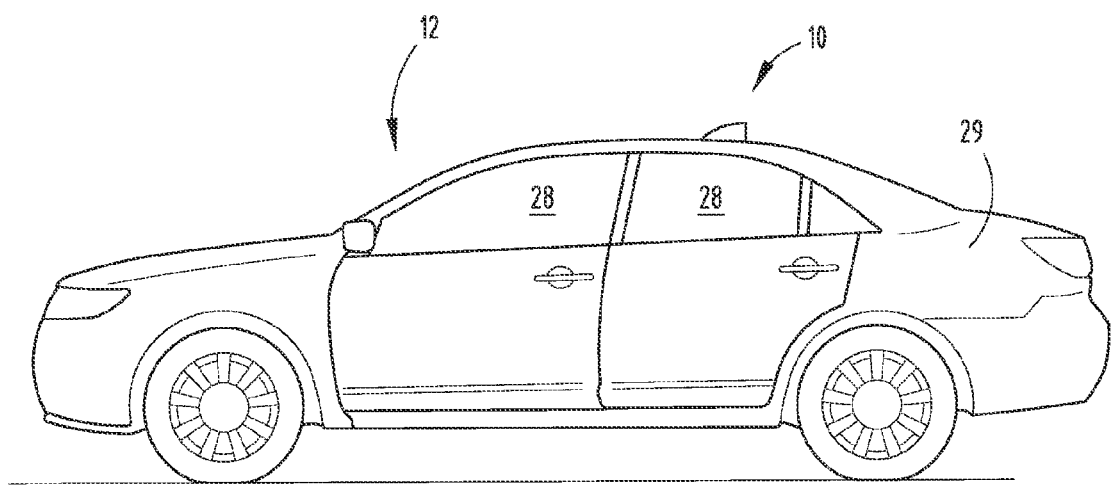
FIG. 2 is a side elevational view of the vehicle of FIG. 1.

As illustrated in FIGS. 1 and 2, the imager module 10 is generally configured for use with the vehicle 12 having an interior cabin 27. The imager module 10 may be positioned on any of a plurality of windows 28 or an external panel 29 of the vehicle 12. The vehicle 12 includes a power supply that can supply electrical power to the imager module 10. The imager module 10, as disclosed herein, may also include other components such as, but not limited to, one or more components of a radio and/or a satellite system.

Referring now to the illustrated embodiment of FIGS. 3-7, the shroud 20 of the imager module 10 generally includes an aerodynamic construction. Each of first and second sides 30, 32 of the shroud 20 include an air-guiding channel 34. It is generally contemplated that multiple air-guiding channels 34 may be present on the shroud 20. It is also generally contemplated that the shroud 20 may take a variety of geometries, colors, and sizes depending on intended use and the vehicle 12 to which the imager module 10 will be attached. A rear portion 36 of the shroud 20 defines the viewing aperture 24 that is configured to receive a rear protective cover 38 of the imager system 25. The viewing aperture 24 and imager system 25 can be configured to have a vertical field of view of approximately 10 degrees to 30 degrees, or approximately 15 degrees to 25 degrees. The viewing aperture 24 and imager system 25 can be configured to have a horizontal field of view of approximately 20 degrees to 60 degrees, or approximately 35 degrees to 45 degrees. The rear protective cover 38 defines an aperture 40 that is configured to interface with an imager lens 42 of the imager system 25 or a protective lens cover 44 disposed adjacent to the imager lens 42. The shroud 20 is generally positioned on the first side 16 of the support 14 and protects the imager system 25 from weather, dirt, and debris. Exemplary protective covers are described in commonly assigned U.S. patent application Ser. No. 13/428,799, filed on Mar. 23, 2012, entitled "LENS CLEANING APPARATUS," now U.S. Pat. No. 8,899,761, the entire disclosure of which is hereby incorporated herein by reference.

As shown in FIGS. 7-9, the first side 16 of the support 14 defines an opening 45 through which the electrical connector 26 extends. The first side 16 of the support 14 also includes a plurality of mechanical fastener apertures 46 adapted to receive mechanical fasteners for securing the imager system 25 and related components to the first side 16 of the support 14. Complementary fastener apertures 48 are positioned inside the shroud 20, such that mechanical fastener apertures can be used to secure the support 14 to the shroud 20 (FIGS. 8 and 9).

A lens holder 47 (FIG. 19A) is secured via mechanical fasteners to the first side 16 of the support 14. The lens holder 47 contemplated for the disclosed imager module 10 is constructed of aluminum or similar material, which maintains substantially consistent tolerances as compared to traditional plastic fasteners and the like. By way of explanation and not limitation, the thermal properties of aluminum, as compared to plastics, allows for the optical focus of the imager lens 42 to be maintained over a larger temperature range. The bottom or second side 18 of the support 14 includes an outer flexible seal 49, as well as the electrical connector 26 (FIG. 10) that is surrounded by a protective housing 52. The outer flexible seal 49 may be an ultraviolet curing seal that adheres glass to the housing 52. The outer flexible seal 49 may also be a thermal curing seal. The second side 18 also includes a rigid securing boss 54. The securing boss 54 includes a cylindrical construction and is connected with a substantially rigid base 56. The securing boss 54 is generally configured to be received in one of the external panels 29 of the vehicle 12 and fastened thereto to secure the imager module 10 to the vehicle 12. The outer flexible seal 49 allows for the imager module 10 to be fastened to the vehicle 12 in a substantially sealed condition, such that the cavity 22 defined by the support 14 and the shroud 20 does not require a secondary sealed construction. Accordingly, the overall size of the entire imager module 10, and in particular, the shroud 20, can be minimized. It is contemplated that the outer flexible seal 49 will adequately protect the electrical connector 26, which includes a power and data plug, as well as the rigid securing boss 54, from external contaminants, such as dirt, debris, and water.

Figure 11:
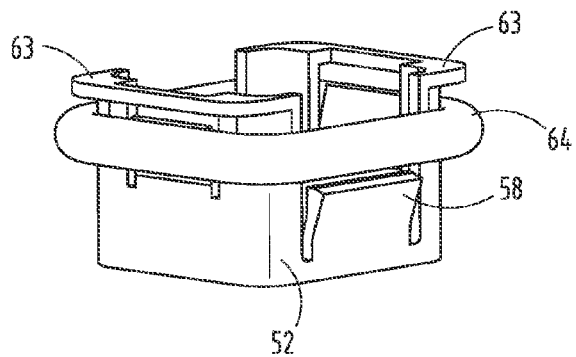
FIG. 11 is a rear perspective view of one embodiment of a power and data plug housing for an imager module of the present invention.
Figure 12:
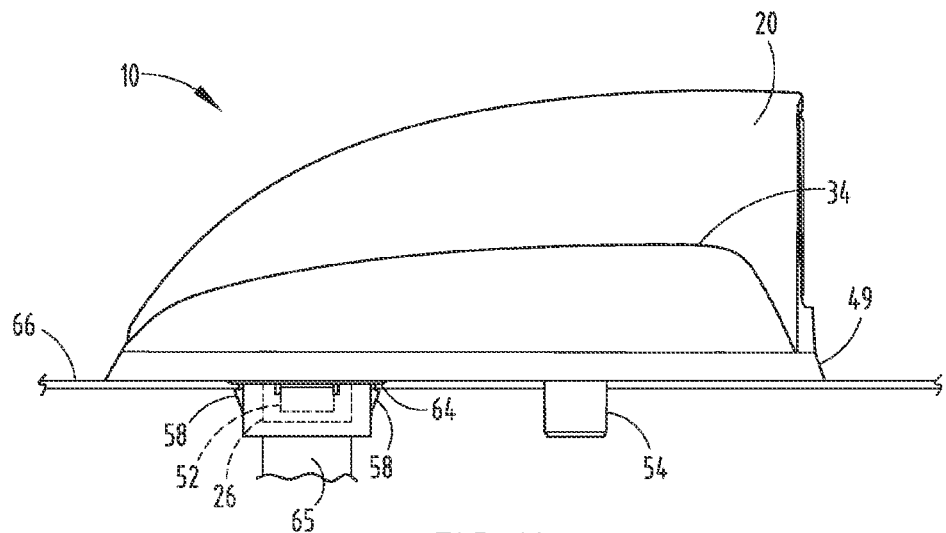
FIG. 12 is a side elevational view of an imager module with a power and data plug housing.
Figure 12A:
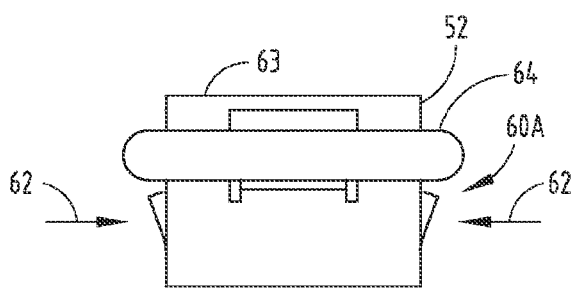
FIG. 12A is a side elevational view of a power and data plug housing prior to insertion into a vehicle panel.
Figure 12B:
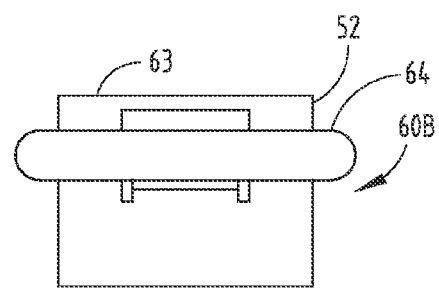
FIG. 12B is a side elevational view of a power and data plug housing during insertion into a vehicle panel.

Referring to FIGS. 11-12B, the housing 52 includes a snap-fit construction, including at least one or more spring-biased engagement members 58. The spring-biased engagement members 58 are designed to move between a standard position 60A (FIG. 12A) and a flexed position 60B (FIG. 12B). The spring-biased engagement members 58 are biased to the standard position 60A. During insertion of the housing 52 into one of the external panels 29, the spring-biased engagement members 58 flex inward in the direction of arrows 62 to the flexed position 60B, until fully seated in the external panel 29 or window 28 of the vehicle 12, at which point, the spring-biased engagement members 58 snap back and relocate to the standard position 60A, thus securing the electrical connector 26 with a complementary connector 65 inside the external panel 29 (FIG. 12) of the vehicle 12. A securing flange 63 engages the first side 16 of the support 14 to hold the housing 52 in place. A gasket 64 is disposed around an outer periphery of the housing 52, thereby sealing the housing 52 against the second side 18 of the support 14. The snap-fit construction of the spring-biased engagement members 58 can serve as an audible indicator that the imager module 10 has been fully seated and secured with the complementary connector 65 in the vehicle 12. Further, the snap-fit construction of the spring-biased engagement members 58 may also serve as a tactile indicator that the imager module 10 has been fully seated and secured with the complementary connector 65 in the vehicle 12. The configuration of the housing 52 and electrical connector 26 allows for connection of the imager module 10 proximate the interface of the external panel 29 and the second side 18 of the support 14. Accordingly, an elongate pigtail connector is unnecessary and fast and reliable connection of the imager module 10 with the vehicle 12 can be accomplished.

Referring now to FIGS. 13-19, the imager system 25 disposed inside the imager module 10 includes an imager housing 70 that protects and supports an imager device 72 disposed therein. The rear protective cover 38 includes a gasket 71 that generally seals the rear protective cover 38 against the shroud 20. In addition, the rear protective cover 38 is positioned over the imager lens 42 and maintains a secure connection with the imager housing 70 by way of a friction-fit, snap-fit, tape, glue, or any other fastening arrangement, as understood by a person having ordinary skill in the art. In one embodiment, the rear protective cover 38 includes a plurality of engagement flanges 73 (FIGS. 16 and 19) that frictionally-fit, snap-fit, tape, glue, or any other fastening arrangement, as understood by a person having ordinary skill in the art. The rear protective cover 38 and gasket 71 protect the imager system 25 from dirt and debris and also minimize or eliminate light leakage around the imager lens 42. The protective lens cover 44 of the rear protective cover 38 is an at least partially transparent cover that is positioned over the imager lens 42. The protective lens cover 44 protects the imager lens 42 from the weather, as well as dirt and debris. In another embodiment, the rear protective cover 38 does not include a protective lens cover 44, and instead interfaces directly with the imager lens 42, which extends into the aperture 40, and is therefore externally exposed.

Figure 18:
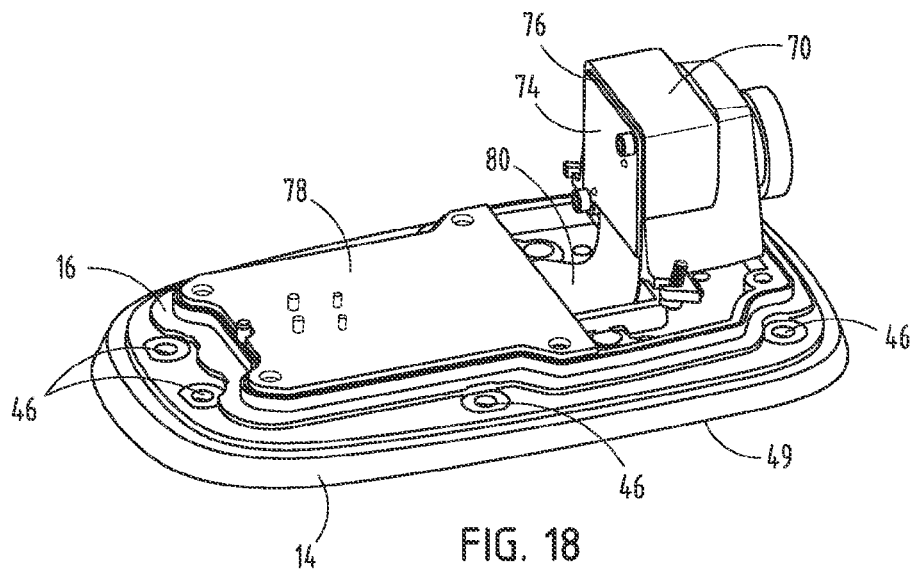
FIG. 18 is a top front perspective view of a support and imager system for an imager module of the present invention.
Figure 19:
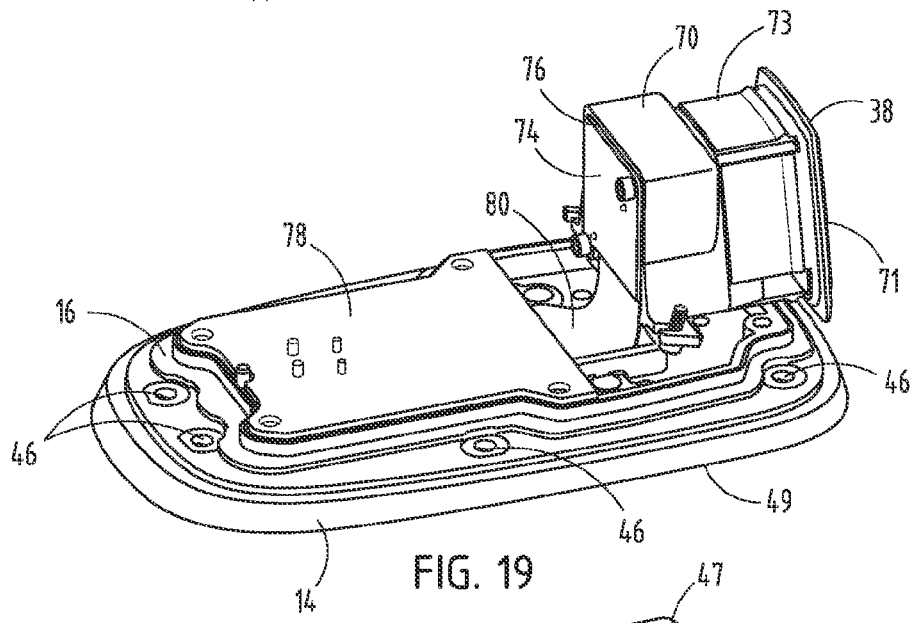
FIG. 19 is a top front perspective view of a support and imager system installed in a support for an imager module of the present invention with a protective lens cover.
Figure 19A:
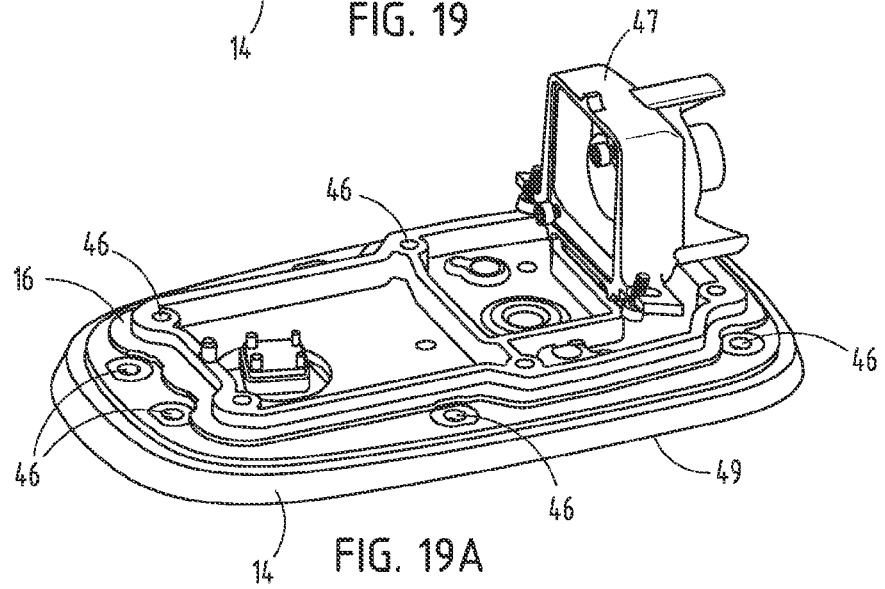
FIG. 19A is a top front perspective view of a support and imager system installed in a support for an imager module of the present invention without the protective lens cover and without the circuit board.

Referring again to FIGS. 13-19, the imager device 72 is connected with a vertical circuit board 74 that extends along a rear surface 76 of the imager housing 70. The vertical circuit board 74 is operably connected with a horizontal circuit board 78 that is disposed on the support 14 and includes a shape that is generally complementary to an internal configuration of the support 14 (FIGS. 18 and 19). A flexible data and power connector 80 operably connects the vertical circuit board 74 with the horizontal circuit board 78. For purposes of explanation and not limitation, the operable connection of the vertical circuit board 74 and the horizontal circuit board 78 may be a flexible connector or a ribbon connector, such that the vertical circuit board 74 and the horizontal circuit board 78 can move with respect to one another during manufacturing, and then be secured within the shroud 20. The horizontal circuit board 78 is electrically connected with the electrical connector 26, which extends downwardly from the second side 18 of the support 14 of the imager module 10. The approximate orthogonal construction of the vertical circuit board 74 with the horizontal circuit board 78 reduces the size requirement of the cavity 22. The electrical connector 26 includes an internal portion 79 that connects with the horizontal circuit board 78 and an external portion 81 that interfaces with the complementary connector 65.

According to one embodiment, the imager system 25 is a high dynamic range imager, wherein examples of such a system are described in U.S. patent application Ser. Nos. 11/999,623; 12/082,215; 12/150,234; 12/157,476; 12/360,867; and 12/361,025, all entitled "IMPROVED IMAGING DEVICE," the entire disclosures of which are hereby incorporated herein by reference.

Figure 20:
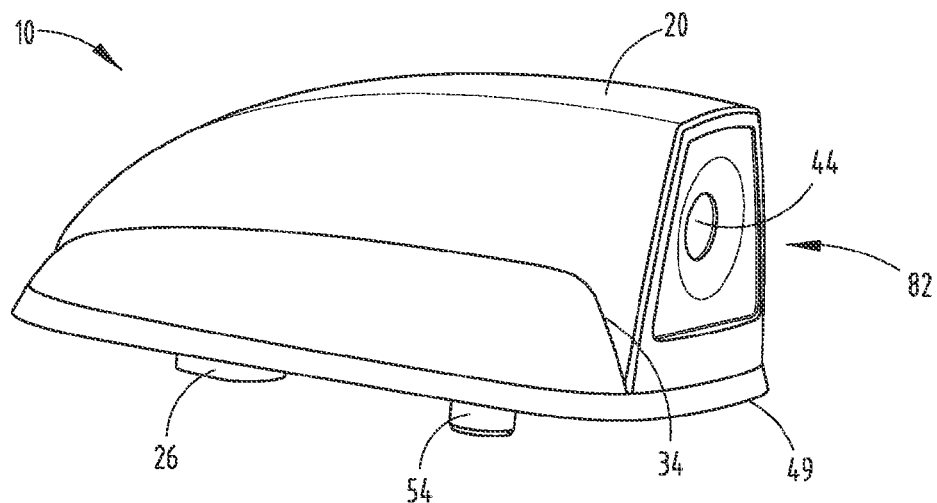
FIG. 20 is a top rear perspective view of another embodiment of an imager module of the present invention.
Figure 21:
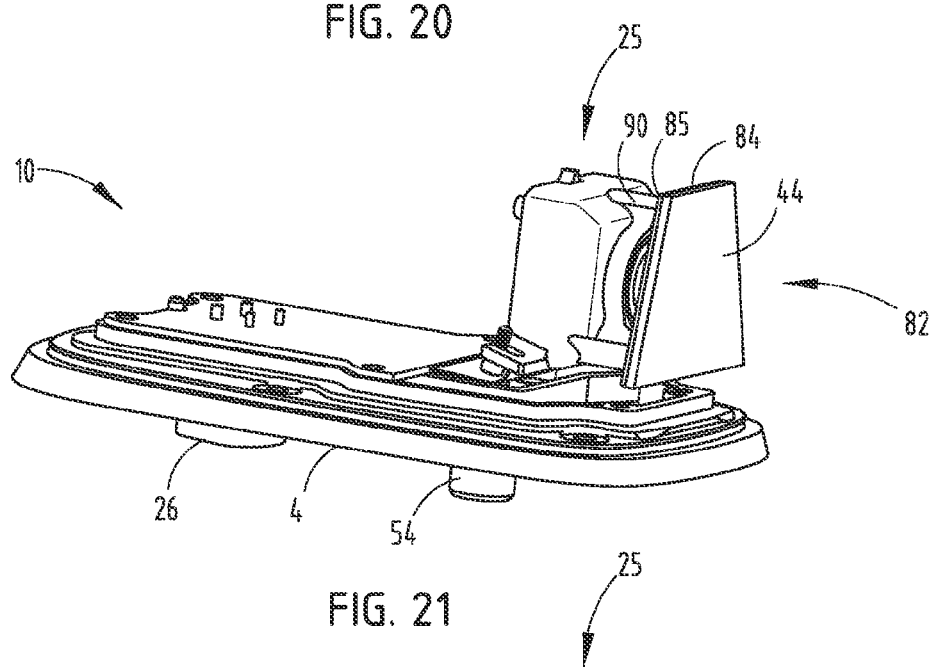
FIG. 21 is a top rear perspective view of the imager module of FIG. 20 with the shroud removed.
Figure 22:
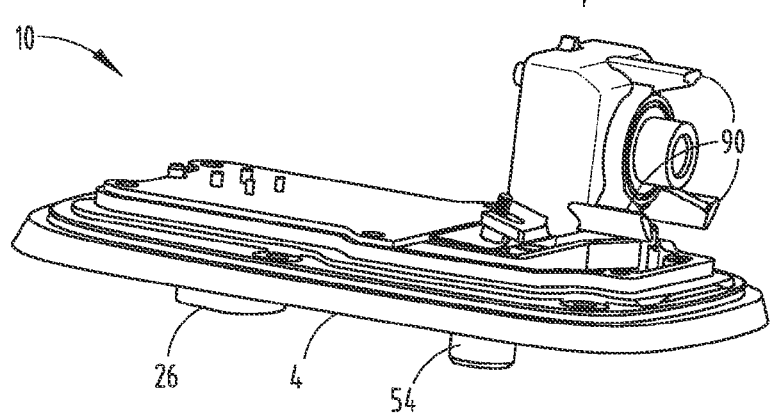
FIG. 22 is a top rear perspective view of the imager module of FIG. 21 with both the shroud and the protective glass removed.

Referring now to FIGS. 20-22, in another embodiment of the present invention, a heated lens cover assembly 82 is incorporated into the imager module 10. The heated lens cover assembly 82 is useful in removing water and/or ice from the general area of aperture 40, thereby providing a substantially clear viewing area by which the imager system 25 can capture images. As shown in FIG. 21, which illustrates the imager module 10 with the shroud 20 removed, the heated lens cover assembly 82 includes the protective lens cover 44, which is disposed outwardly and in abutting contact with an inside portion of the rear protective cover 38. A transparent conductive oxide layer 84 is disposed behind the rear protective lens cover 44. Electrical contacts are made with the transparent conductive oxide layer 84. To heat the rear protective lens cover 44, an electrical current is passed by the electrical contacts through the transparent conductive oxide layer 84. The resulting electrical resistance in the transparent conductive oxide layer 84 generates heat. A foam layer 85 is disposed between the imager system 25 and the transparent conductive oxide layer 84 to provide very limited movement and shock absorption between the rear protective lens cover 44 and the imager system 25. The foam layer 85 is supported on forward flanges 90 (FIG. 22).

Figure 23:
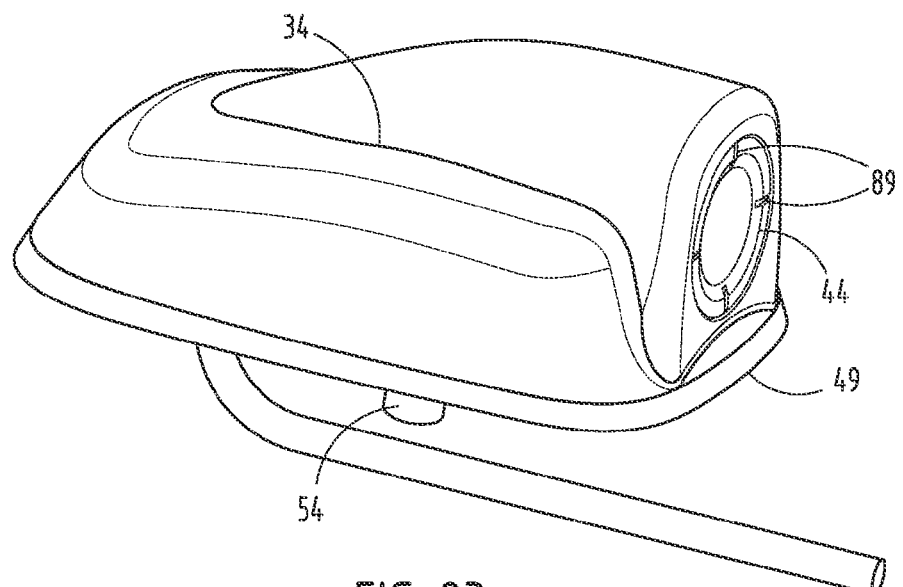
FIG. 23 is a top rear perspective view of another embodiment of an imager module of the present invention.
Figure 23A:
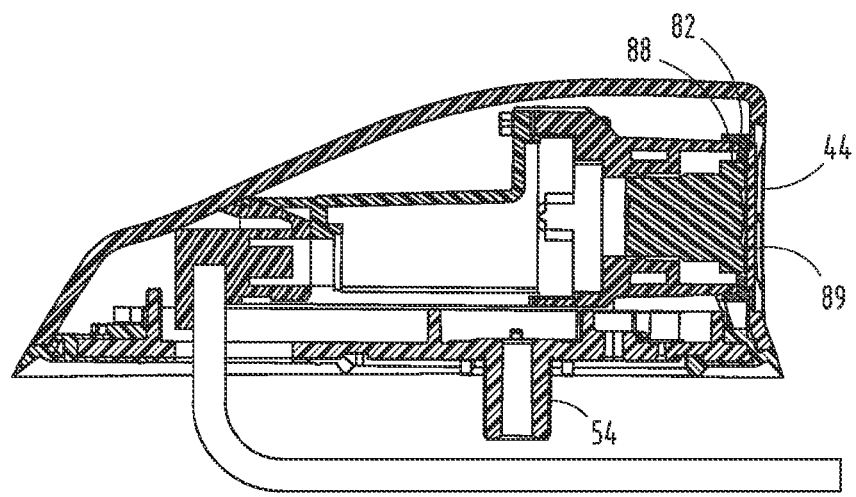
FIG. 23A is a top rear perspective cross-sectional view of the imager module of FIG. 23.
Figure 24:
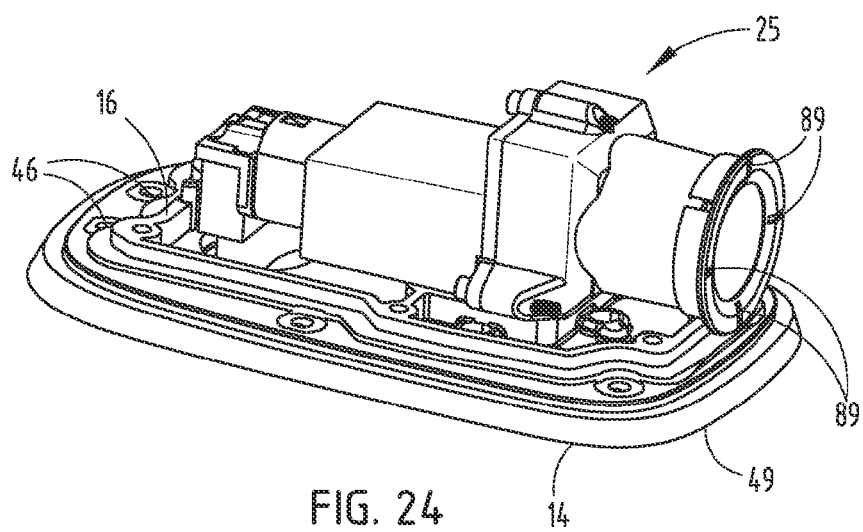
FIG. 24 is a top rear perspective view of the imager module of FIG. 23 with the shroud removed.
Figure 25:
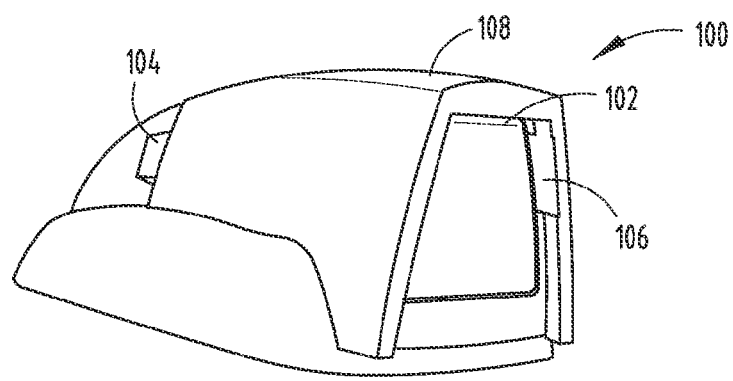
FIG. 25 is a top rear perspective view of yet another embodiment of an imager module of the present invention.
Figure 26:
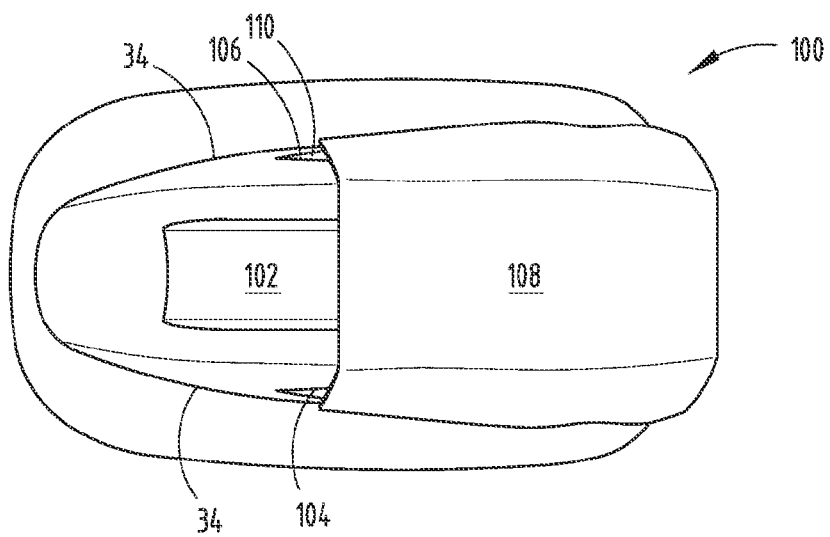
FIG. 26 is a top plan view of the imager module of FIG. 25.
Figure 27:
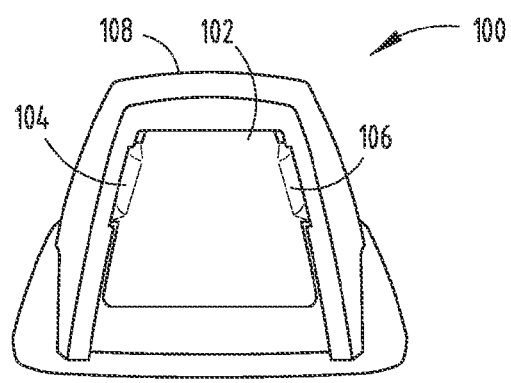
FIG. 27 is a rear elevational view of the imager module of FIG. 25.
Figure 28:
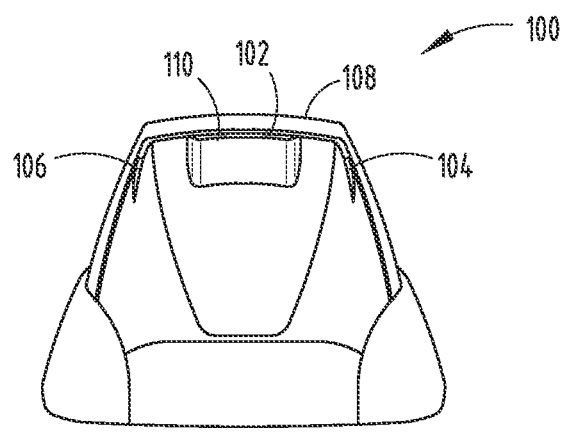
FIG. 28 is a front elevational view of the imager module of FIG. 25.
Figure 29:
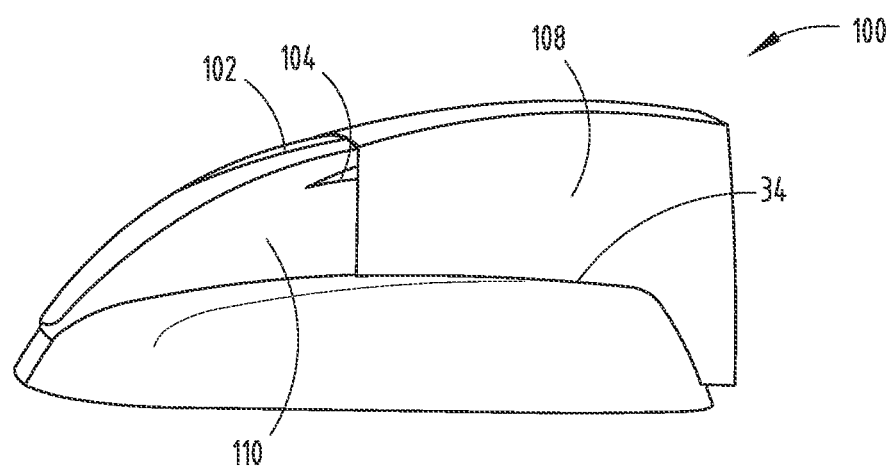
FIG. 29 is a side elevational view of the imager module of FIG. 25.
Figure 30:
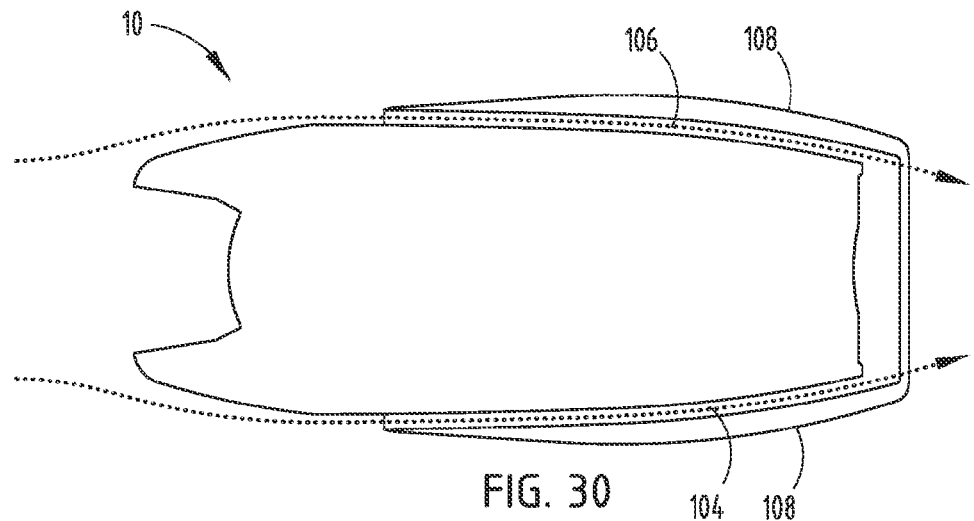
FIG. 30 is a top plan cross-sectional view of the imager module of FIG. 25 illustrating air flow.
Figure 31:
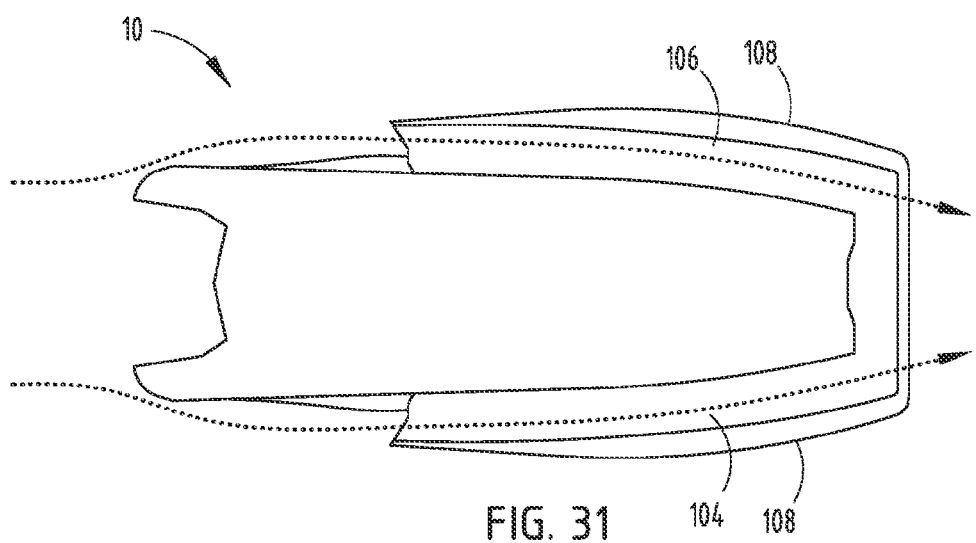
FIG. 31 is a second top plan cross-sectional view of the imager module of FIG. 25 illustrating air flow.
Figure 32:
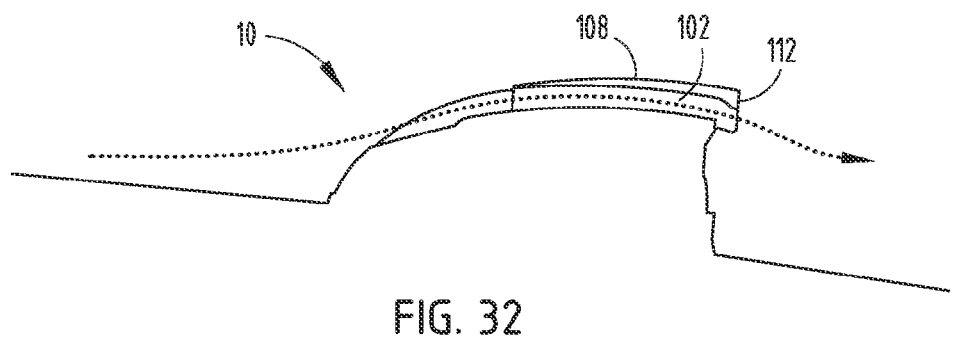
FIG. 32 is a side elevational cross-sectional view of the imager module of FIG. 25 illustrating air flow.

Referring now to FIGS. 23 and 24, in yet another embodiment of the present invention, the heated lens cover assembly 82 includes spring terminal contacts 88 that provide flexibility in a longitudinal direction during installation of the heated lens cover assembly 82 into the shroud 20 and in connection with the imager system 25. The heated lens cover assembly 82 includes a sealing frame 89 that, when tightened against the shroud 20 of the imager module 10, draws the spring terminal contacts 88 away from the imager system 25 and toward the transparent conductive oxide layer 84 disposed adjacent a back side of the heated lens cover assembly 82. The versatility of the spring terminal contacts 88 allows for the heated lens cover assembly 82 to be installed without concerns of damaging or breaking wires that would otherwise relay current to the transparent conductive oxide layer 84 to heat the rear protective lens cover 44. It is contemplated that the spring terminal contacts 88 and the heated lens cover assembly 82 may be used in conjunction with any of the embodiments discussed herein. Conductive elastomers or other non-solder contacts may also be used instead of or in addition to the spring terminal contacts 88.

Figure 35:
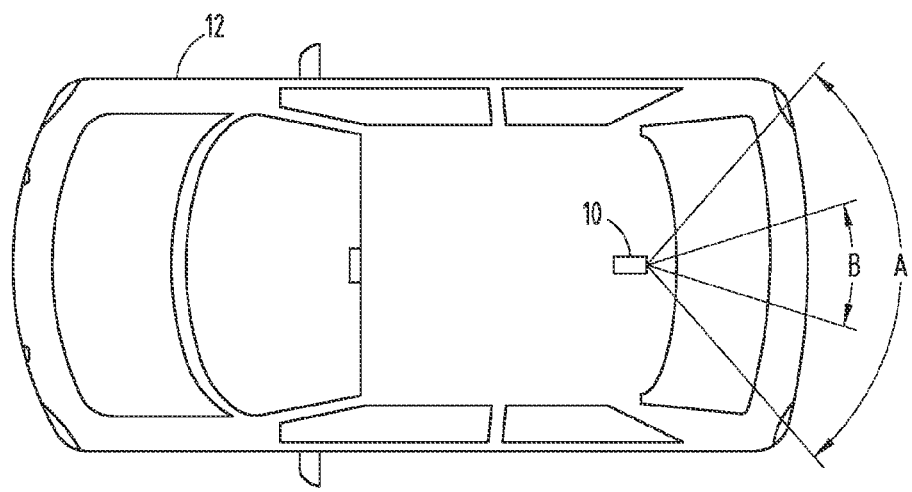
FIG. 35 is a top plan view of a vehicle incorporating one embodiment of the present invention and illustrating exemplary fields of view with respect to the vehicle.
Figure 36:
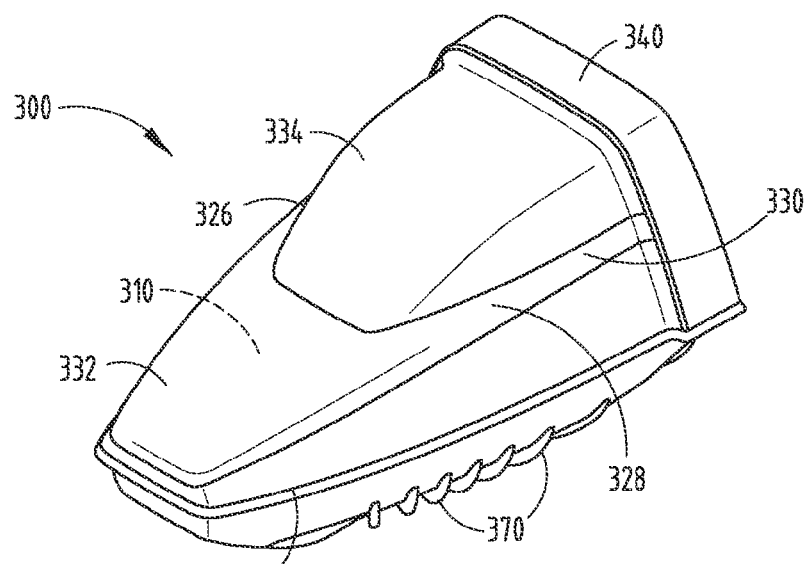
FIG. 36 is a top front perspective view of another embodiment of an imager module of the present invention.
Figure 37:
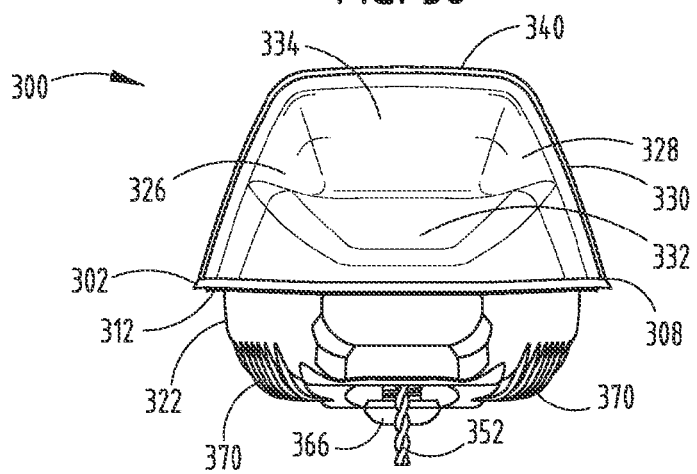
FIG. 37 is a front elevational view of the imager module of FIG. 36.
Figure 38:
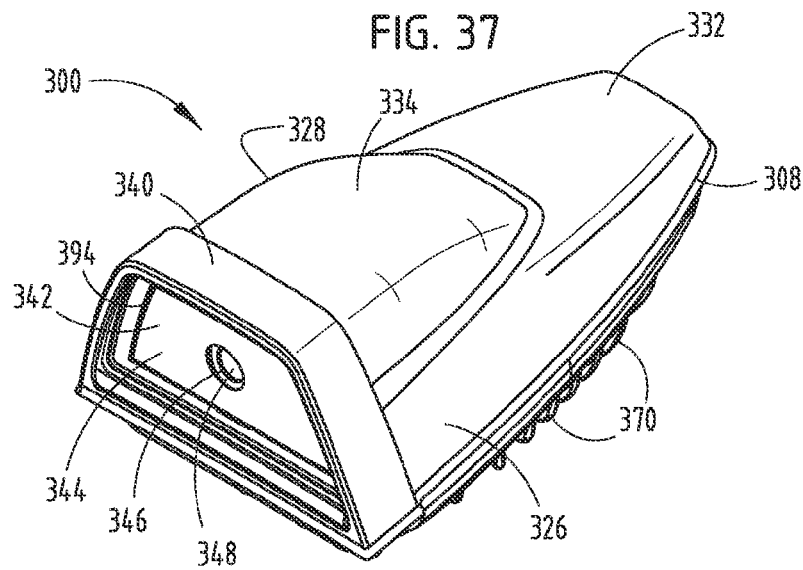
FIG. 38 is a top rear perspective view of the imager module of FIG. 36.

According to one embodiment, the imager module 10 can be configured to have a variable field of view. For purposes of explanation and not limitation, as illustrated in FIG. 35, the imager module 10 can have a first field of view A (FOV A) and a second field of view B (FOV B). The imager module 10 can utilize the first field of view (FOV A) when the vehicle 12 is in reverse, and the imager module 10 can utilize the second field of view (FOV B) when the vehicle 12 is not in reverse (e.g., in drive and moving forward with respect to a normal operating direction of the vehicle 12). In such an embodiment, the first field of view (FOV A) is a wider field of view than the second field of view (FOV B). The narrower field of view (FOV B) can be such that the image displayed to a user simulates the field of view perceived by a user viewing rearward of the vehicle 12 by a rearview device such as a rearview mirror. It should be appreciated by those skilled in the art that the two fields of view varying in the horizontal direction are for purposes of example, and that the imager module 10 can be configured to have a plurality of fields of view that vary in the horizontal and/or vertical direction. It should further be appreciated by those skilled in the art that although the first and second fields of view (FOV A and FOV B) are illustrated as being overlapping (i.e., FOV A includes FOV B), the imager module 10 can be configured to have partially overlapping variable fields of view and/or non-overlapping variable fields of view.

The imager module 10 can be configured such that the field of view is automatically altered based upon one or more operating conditions of the vehicle 12. As described above, the imager module 10 can change fields of view when the vehicle 12 is shifted from a reverse gear to a forward driving gear. Additionally or alternatively, the imager module 10 can be configured to manually adjust the field of view, such that a user can alter the field of view of the imager module 10. Thus, a user can manually adjust the field of view of the image that is being displayed.

In an embodiment illustrated in FIG. 35, the imager module 10 can include a variable focus lens (e.g., a telescoping lens) or a fixed zoom lens.

Aerodynamics

FIGS. 25-32 illustrate another embodiment of the imager module 10, which includes a shroud 100. The shroud 100 of the imager module 10 may include a variety of shapes and configurations to relay air near or across the protective lens cover 44. In addition, because the imager module 10 is disposed on the external panel 29 (FIG. 1) of the vehicle 12, the imager module 10 may be subject to harsh weather conditions. As such, the shroud 100 of the imager module 10 may be covered by dirt and debris. The dirt and debris may also cover the viewing aperture 24 adjacent the imager lens 42, such that clear image data cannot be received through the imager lens 42. Accordingly, a shroud construction that effectively passes air over the viewing aperture 24 to clean the viewing aperture 24 from dirt and debris may be utilized. Specifically, in one embodiment, the shroud 100 includes exterior walls designed to manipulate the flow of air currents past the shroud 100 while the vehicle 12 maintains a typical driving speed. The air currents are directed over the viewing aperture 24 to remove dirt and debris that may have collected near the viewing aperture 24.

Referring again to FIGS. 25-32, the shroud 100 includes a top air channel 102, as well as first and second side air channels 104, 106. The air channels 102, 104, 106 are defined by a space between an outer wall 108 and an inner wall 110 of the shroud 100. The air channels 102, 104, 106 may take on a variety of angles and dimensions. The air channels 102, 104, 106 are designed to taper gradually toward the front of the imager module 10 and direct air that passes over and through the shroud 100 down across the protective lens cover 44. It is contemplated that the air that passes by the protective lens cover 44 may be separated from the protective lens cover 44 (FIG. 32), thereby preventing dirt and debris from being deposited on the protective lens cover 44, or may sweep over the protective lens cover 44 in a non-separated condition to remove dirt and debris that has settled on the protective lens cover 44. A rear top portion of the outer wall 108 includes a curved construction 112 (FIG. 32) that directs air across the viewing area of the imager lens 42 in a separated fashion. It is contemplated that the curved construction 112 may be positioned at a shallow angle to sweep air across the imager lens 42 in a non-separated fashion, or may be positioned at a steeper angle to prevent dirt and debris from contacting the protective lens cover 44. Rear side portions of the outer wall 108 include a more gradually curved construction 112, however, depending on the desired air channel performance, could be changed to have a more aggressive curve.

It is generally contemplated that the protective lens cover 44 may be used in conjunction with a lens or lens cover that is exposed or external relative to the shrouds 20, 100 of the imager module 10, or used with a lens that is internal to the outer periphery of or flush with the shrouds 20, 100 of the imager module 10. It is generally contemplated that the protective lens cover 44 will have a constant wall thickness to eliminate the possibility of distorted images and ghosting problems. In addition, it is contemplated that ribs may be positioned adjacent to the shrouds 20, 100 that are designed to direct water sprayed over the vehicle 12, such as during a car wash or during a rainstorm, for example, thereby cleaning the protective lens cover 44. It is also contemplated that the protective lens cover 44 may be angled slightly upwardly such that the imager lens 42 can be accessed during the washing of the vehicle 12.

It is also contemplated that an upper outer wall, as well as first and second side outer walls, may be pivotally connected with the shroud 100 such that they redirect the angle of air flow from a separated airflow condition away from the imager lens 42 to an unseparated airflow condition near the imager lens 42, or conversely from an unseparated condition near the imager lens 42 to a separated condition away from the imager lens 42. The angle and desired performance of the shroud 100 may be modified based on the speed of the air passing over the imager module 10, may be adjusted manually by a user by way of a control in the vehicle 12, or may be adjusted based on imager system performance and software protocol that can determine when the protective lens cover 44 should be cleaned.

The aspects disclosed above with reference to the imager module 10 contemplate that the shrouds 20, 100 discussed herein are adapted to withstand various environmental conditions, including rain, ice, sleet, snow buildup, car wash activities, high-speed driving, and low-speed driving. In addition, it is generally contemplated that the imager lens 42 will be directed at an angle from 7.5 degrees downward to 15 degrees downward, depending on the rearward slope of the external panel 29 to which the imager module 10 is attached.

Data Communication

Figure 33:
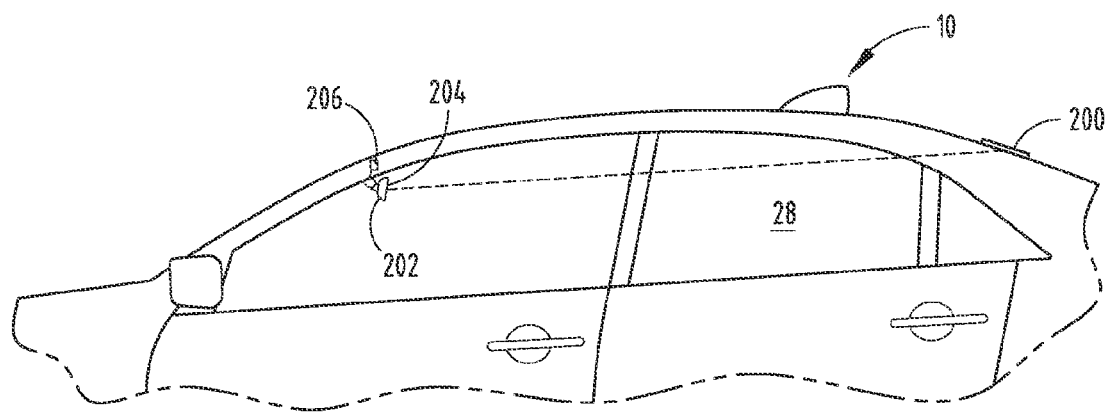
FIG. 33 is a partial side elevational view of one embodiment of a data relay system of the present invention.
Figure 34:
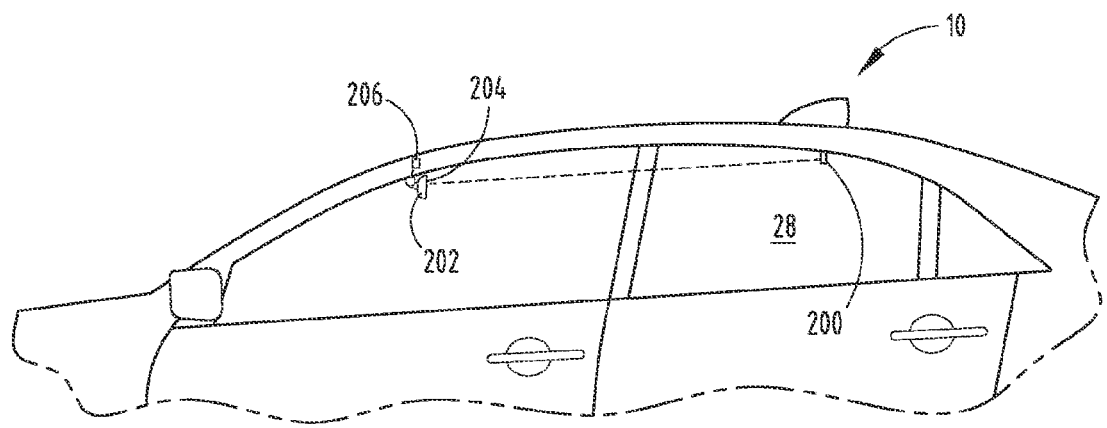
FIG. 34 is a partial side elevational view of another embodiment of a data relay system of the present invention.

Referring now to FIGS. 33 and 34, one embodiment of the imager module 10 includes a transmitter 200 that is operably connected with the imager module 10, and which is adapted to receive data, such as image data, captured by the imager system 25. The data is communicated wirelessly from the transmitter 200 to a data receiver 202 disposed adjacent to or inside a rearview assembly 204 in the interior cabin 27 of the vehicle 12. The data receiver 202 communicates the data to a processor 206 where the data is processed, and ultimately an image associated with the communicated data is displayed on a display device disposed in or on the rearview assembly 204.

It is contemplated that the data may be communicated from the transmitter 200 to the data receiver 202 via infrared signals that are transmitted through the interior cabin 27 of the vehicle 12. However, it should be appreciated that signals of other frequencies can be used, such that the transmitter 200 and data receiver 202 are configured to receive such signals at other frequencies. Typically, the data receiver 202 includes a filter that is configured to pass the signal from the transmitter 200 (e.g., an infrared frequency), while blocking other frequencies that would appear as noise to the data receiver 202.

In the embodiment illustrated in FIG. 33, the transmitter 200 is disposed on an outside portion of a rear window 28 of the vehicle 12. The transmitter 200 communicates data to the data receiver 202 disposed proximate to or inside the rearview assembly 204 by transmitting a signal through the rear window 28 and the interior cabin 27 to the data receiver 202.

In another embodiment, as illustrated in FIG. 34, the transmitter 200 extends downwardly through the external panel 29 of the vehicle 12 into the interior cabin 27. The transmitter 200 communicates data to the data receiver 202 disposed proximate to or inside the rearview assembly 204 by communicating a signal through the interior cabin 27 to the data receiver 202.

In either of the embodiments shown in FIGS. 33 and 34, the imager module 10 can be mounted and sealed to the vehicle 12, as described herein. A seal or grommet can be used to form a sealed connection between the imager module 10 and the vehicle 12. A grommet can be used to seal a connection between the transmitter 200 (or wire thereof) and the vehicle 12 when the transmitter 200 extends through the external panel 29 (FIG. 34) into the interior cabin 27 of the vehicle 12.

It will be appreciated by those skilled in the art that the transmitter 200 and data receiver 202 can be transceivers, such that the communication system can be configured for two-way communication.

Referring now to the embodiment illustrated in FIGS. 36-42, an imager module 300 may be secured onto the vehicle 12 and includes a support 302 with a first side 304 and a second side 306. A shroud 308 is coupled with the first side 304 of the support 302. The support 302 and the shroud 308 define a cavity 310 within which a carriage insert 312, a circuit board carrier 314, a circuit board 316, and an imager 318 are disposed. An electrical connector 320 is coupled to the circuit board 316 through the circuit board carrier 314 and is configured to provide power and data to the imager 318. The electrical connector 320 is also designed to interface with a complementary data port disposed on the vehicle 12 to which the imager module 300 is attached. The imager module 300 is generally configured for use with the vehicle 12 by clamping a carriage 322 installed between a headliner and a roof of the vehicle 12 with the carriage insert 312. The imager module 300 may be positioned on any of the plurality of windows 28 or the external panel 29 of the vehicle 12. The vehicle 12 provides power and data through the complementary data port disposed on the vehicle 12 to the imager module 300. The imager module 300 may also include a multitude of components, such as, but not limited to, radio, satellite systems, etc.

Referring again to FIGS. 36-42, the shroud 308 of the imager module 300 generally includes a substantially aerodynamic construction. First and second sides 326, 328 of the shroud 308 include an air-guiding channel 330 that redirects air over the shroud 308 as the vehicle 12 travels. In the illustrated embodiment, the shroud 308 includes a two-tier configuration. The shroud 308 has a lower tier 332 that transitions to an upper tier 334. Both the upper and lower tiers 332, 334 merge with an end portion 336 of the imager module 300. It is contemplated that the shroud 300 may take on a variety of geometries other than that shown. Further, it is also contemplated that the shroud 308 may come in a variety of colors and sizes, depending on the desired configuration and the construction of the vehicle 12. More specifically, angles and slopes associated with both the carriage 322 and the shroud 308 of the imager module 300 may be defined by the amount of slope or angle of descent of a portion of the vehicle 12 to which the imager module 300 is attached.

A rear portion 340 of the shroud 308 defines a viewing aperture 342 and is configured to receive a rear protective cover 344 of the imager 318. The viewing aperture 342 and the imager 318 can be configured to include a vertical field of view of approximately 10 degrees to 30 degrees, or approximately 15 degrees to 25 degrees. The viewing aperture 342 and imager 318 can also be configured to have a horizontal field of view of approximately 20 degrees to 60 degrees, or approximately 35 degrees to 45 degrees. The rear protective cover 344 defines an aperture 346 that is configured to interface with an imager lens 348 of the imager 318. The shroud 308 is designed to protect the imager 318 and related electrical components from weather, water, dirt, and debris.

Referring now to FIGS. 39-42, the first side 304 of the support 302 defines an opening 350 through which a power line 352 and a data line 354 extend. The power line 352 may be separate from the data line 354 (FIG. 40) or may be combined. The support 302 also includes a plurality of mechanical fastener apertures 356 configured to receive support fasteners 360 for securing the circuit board carrier 314, and consequently the circuit board 316 and related electrical components, including the imager 318, to the first side 304 of the support 302. The support 302, in turn, is fastened by the same support fasteners 360 to the carriage insert 312, which is positioned adjacent the roof of the vehicle 12 prior to installation of the imager module 300 onto the vehicle 12.

Figure 39:
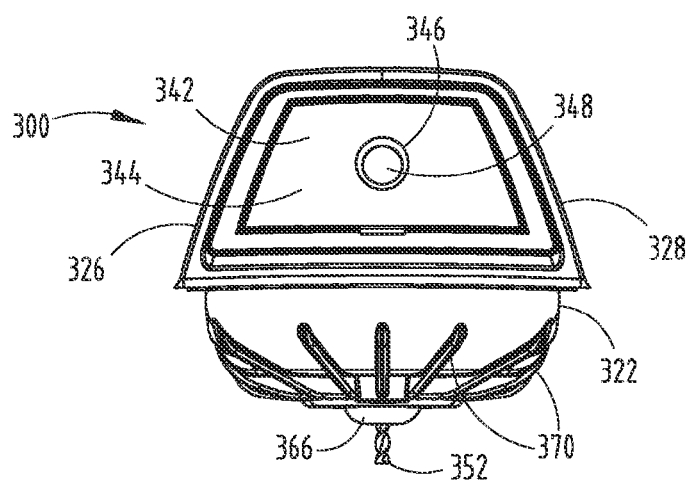
FIG. 39 is a rear elevational view of the imager module of FIG. 36.
Figure 40:
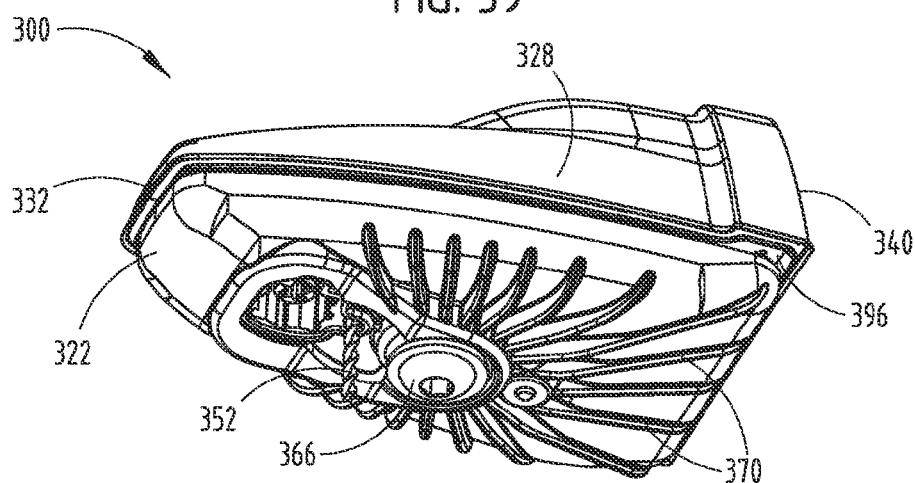
FIG. 40 is a bottom perspective view of the imager module of FIG. 36.
Figure 41:
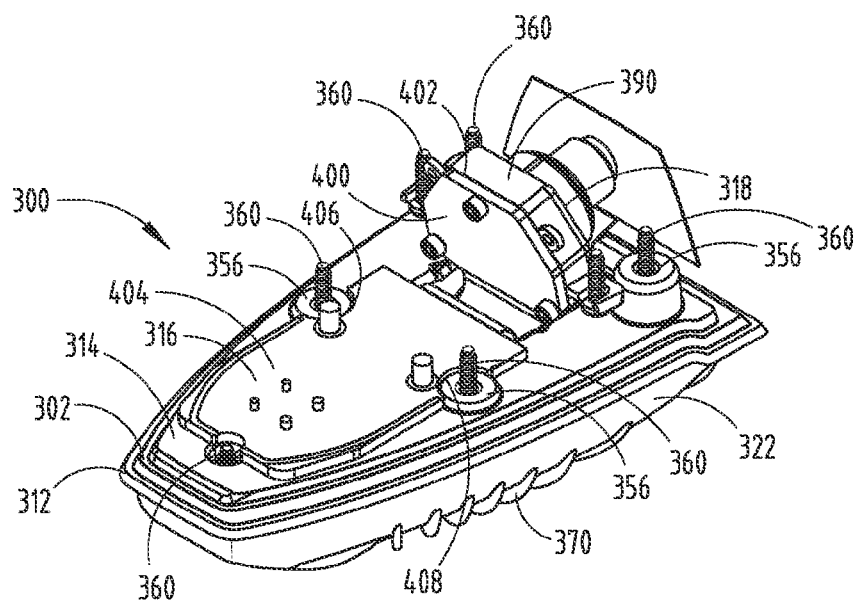
FIG. 41 is a top perspective view of the imager module of FIG. 40 with the shroud removed.

As shown in FIGS. 39 and 40, the carriage 322 is configured to receive a securing boss 362 that extends through the support 302 and carriage insert 312. The securing boss 362 extends through a securing boss aperture 367 in the support 302 and carriage insert 312 and is designed to receive a fastener 366 that extends upwardly through the carriage 322 to fasten the imager module 300 to the vehicle 12. A plurality of radially extending ribs 370 are disposed about the securing boss aperture 367 defined in the bottom of the carriage 322. The radially extending ribs 370 provide additional structural support to the carriage 322, thereby minimizing the likelihood of overtightening the fastener 366, or otherwise damaging the carriage 322 during installation or use. The carriage insert 312 is specifically designed to fit inside the carriage 322 and includes a plurality of ribs 372 on a bottom wall 374 thereof, which are configured to provide structural support to the carriage insert 312. A rear portion of the carriage insert 312 includes locating tabs 378 that receive the support fasteners 360 and also assist during the manufacturing process to locate the carriage insert 312 relative to the support 302. The second side 306 of the support 302 is designed for fitted engagement with a top of the carriage insert 312. Two of the support fasteners 360 are disposed in a rear portion of the support 302, two support fasteners 360 are disposed at a mid-portion of the support 302, and one support fastener 360 is disposed at a forward portion of the support 302. The support fasteners 360 hold the carriage insert 312, the support 302, and the circuit board carrier 314 together (FIG. 41). The imager 318 is disposed inside the imager module 300 and includes an imager housing 390 that protects and supports an imager device 392 disposed therein. The imager 318 otherwise performs in accordance with the imager system 25 discussed above.

A seal 394 is positioned around the rear protective cover 344 and generally seals the rear protective cover 344 against the shroud 308. Another seal 396 is positioned between a periphery of the carrier insert 312 and the roof of the vehicle 12. The seal 396 may be an ultraviolet curing seal that adheres glass to the imager housing 390. The seal 396 may also be a thermal curing seal. The rear protective cover 344 is positioned over the imager lens 348 and maintains a secure connection with the imager housing 390 by way of a friction fit, snap fit, tape, glue, or any other fastening arrangement, as understood by a person having ordinary skill in the art.

Figure 42:
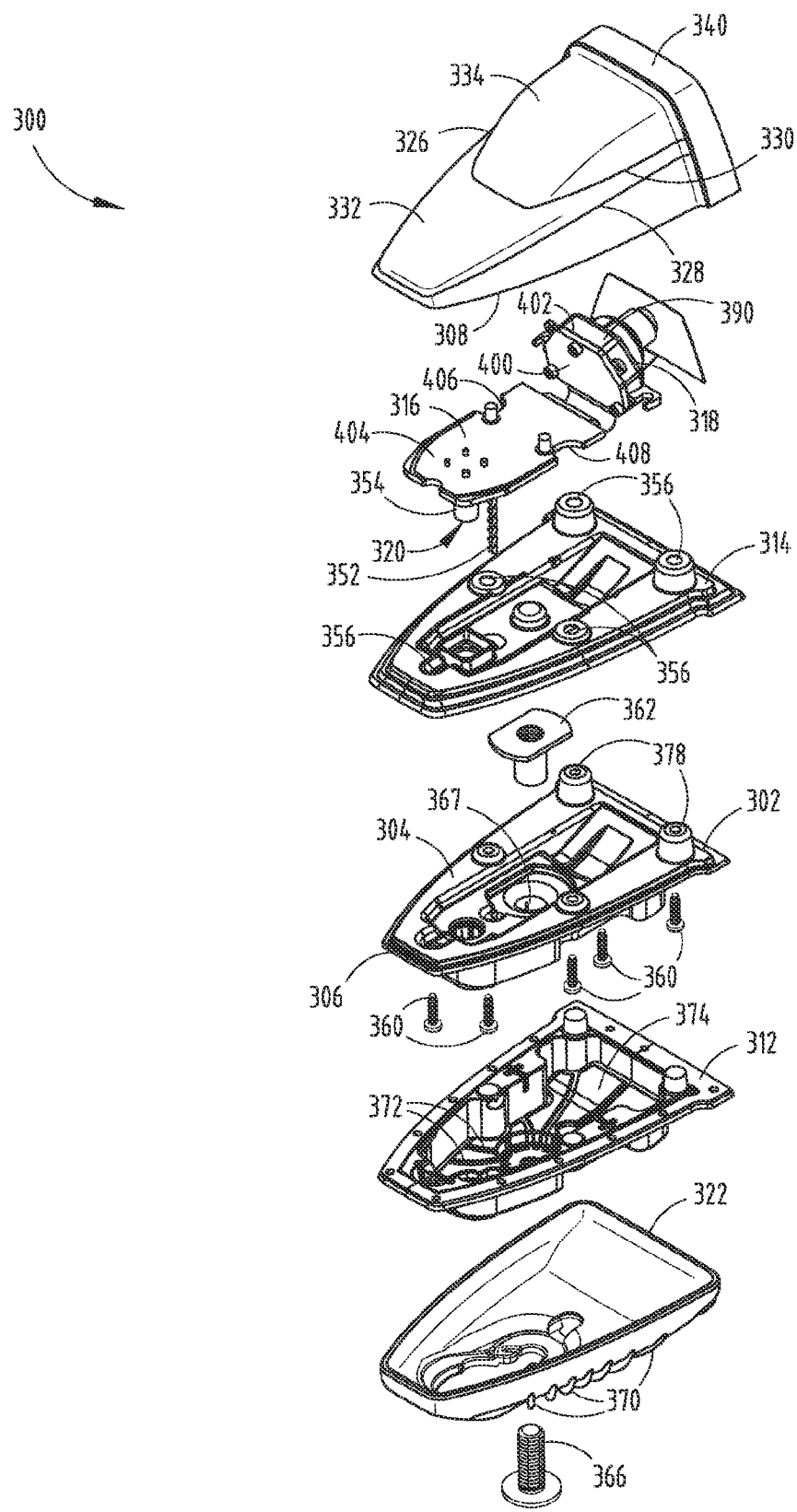
FIG. 42 is an exploded top front perspective cross-sectional view of the imager module of FIG. 36.

Referring now to FIGS. 41 and 42, the imager device 392 is connected with a vertical circuit board 400 that extends along a rear surface 402 of the imager housing 390, as well as a horizontal circuit board 404 that extends over the circuit board carrier 314. The horizontal circuit board 404 includes first and second cutouts 406, 408 with vertically extending supports 410 disposed therein. A flexible data and power connector 412 is disposed between the vertical circuit board 400 and the horizontal circuit board 404. As with the embodiments disclosed above, the orientation of the horizontal circuit board 404 and the vertical circuit board 400 provides efficient use of space in the cavity 310 of the imager module 300. Accordingly, the imager module 300 includes more capability than might otherwise be possible with a single circuit board 316 or several stacked circuit boards aligned in a horizontal configuration only or in a vertical configuration only. Moreover, the overall size requirement of the cavity 310 is reduced because of the configuration of the vertical circuit board 400 and the horizontal circuit board 404.

The imager module 300 may be used in conjunction with a variety of lens cleaning devices, including those discussed in U.S. patent application Ser. No. 13/428,799, filed on Mar. 23, 2012, entitled "LENS CLEANING APPARATUS," now U.S. Pat. No. 8,899,761, and U.S. Patent Application No. 61/511,749, filed on Jul. 26, 2011, entitled "IMAGING DEVICE PROTECTOR AND CLEANER," the entire disclosures of which are hereby incorporated herein by reference.

In any of the embodiments described herein, the imager module 10 and display device can be used instead of an interior rearview mirror. Alternatively, the display device can be integrated with an interior rearview mirror. For example, the imager module 10 and the display device may be used as a rear imager display when the vehicle 12 is in reverse.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes only and are not to be construed as limiting. In addition, the headings noted herein are for example only, and are not to be construed as limiting, nor do the headings limit embodiments from one section from being combined with one or more embodiments from another section.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. An imager module for a vehicle comprising:
a support including a first side and a second side;
a shroud operably coupled with the first side, wherein the support and the shroud define a cavity, the shroud including an inner wall and an outer wall that at least partially covers the inner wall, wherein at least one air channel is defined between the inner wall and the outer wall, the at least one air channel directing air over a lens cover;
a viewing aperture disposed in one of the support and the shroud;
an imager system disposed in the cavity proximate the lens cover; and
an electrical connector configured to provide communication with the imager system, wherein the electrical connector extends outside the cavity through the support.

2. The imager module of claim 1, wherein the electrical connector includes a casing that laterally encloses the electrical connector and includes an open bottom.

3. The imager module of claim 1, further comprising:
a snap-fit connection of the electrical connector with a vehicle system.

4. The imager module of claim 3, wherein the snap-fit connection serves as an audible indicator that the electrical connector has engaged a complementary connector.

5. The imager module of claim 3, wherein the snap-fit connection serves as a tactile indicator that the electrical connector has engaged a complementary connector.

6. The imager module of claim 1, wherein the electrical connector relays both data and power to the imager system.

7. The imager module of claim 1, wherein the imager system includes a first circuit board operably coupled with an imager device and a second circuit board oriented substantially orthogonal to the first circuit board.

8. The imager module of claim 1, further comprising:
an electrostatic discharge shield proximate the support.

9. An imager system for a vehicle imager module, comprising:
a support including a first side and a second side;
a shroud operably coupled with the first side, wherein the support and the shroud define a cavity, the shroud including an inner wall and an outer wall that at least partially covers the inner wall, wherein at least one air channel is defined between the inner wall and the outer wall, the at least one air channel directing air over a lens cover when the vehicle is in motion;
a viewing aperture disposed in one of the support and the shroud;
a first circuit board disposed in the cavity and operably coupled with an imager device;
a second circuit board oriented substantially orthogonal to the first circuit board; and
an electrical connector at least partially disposed outside the cavity and in communication with at least one of the first and second circuit boards.

10. The imager system of claim 9, wherein the electrical connector includes a housing adapted for snap-fit connection with a vehicle system.

11. The imager system of claim 10, wherein the snap-fit connection serves as at least one of a tactile indicator and an audible indicator that the electrical connector has engaged a complementary aperture.

12. The imager system of claim 9, wherein the electrical connector relays both data and power to the imager system.

13. The imager system of claim 9, further comprising:
an electrostatic discharge shield proximate the support.

14. An imager system for a vehicle, comprising:
an exterior imager module mounted to a roof of the vehicle and defining an air channel that directs air over a lens cover of the exterior imager module, the exterior imager module viewing a scene to the rear of the vehicle;
a rearview assembly disposed inside the vehicle and including a receiver, a processor, and a display; and
a transmitter operably coupled with the exterior imager module, wherein data is received by the exterior imager module and relayed wirelessly from the transmitter to the receiver where the data is processed by the processor and displayed on the display;
wherein the transmitter protrudes through a roof of the vehicle into an interior cabin of the vehicle.

15. The imager system of claim 14, further comprising:
an electrical connector in communication with the exterior imager module, wherein the electrical connector is disposed outside a cavity in abutting contact with a second side of a support.

16. The imager system of claim 14, wherein the transmitter relays data to the receiver through a rear window of the vehicle.

17. An imager module for a vehicle roof comprising:
a support including a first side and a second side;
a carriage securely engaged with the second side of the support, wherein at least a portion of said vehicle roof is disposed between the carriage and the support;
an imager system disposed adjacent to the first side of the support; and
a shroud at least partially covering the imager system, wherein the shroud includes at least one air channel disposed on an outer periphery thereof to direct air near a viewing aperture of the imager module.

* * * * *